F. FIDLER AND J. G. MAXWELL.
KILN.
APPLICATION FILED DEC. 27, 1919.
1,364,090.
Patented Jan. 4, 1921.
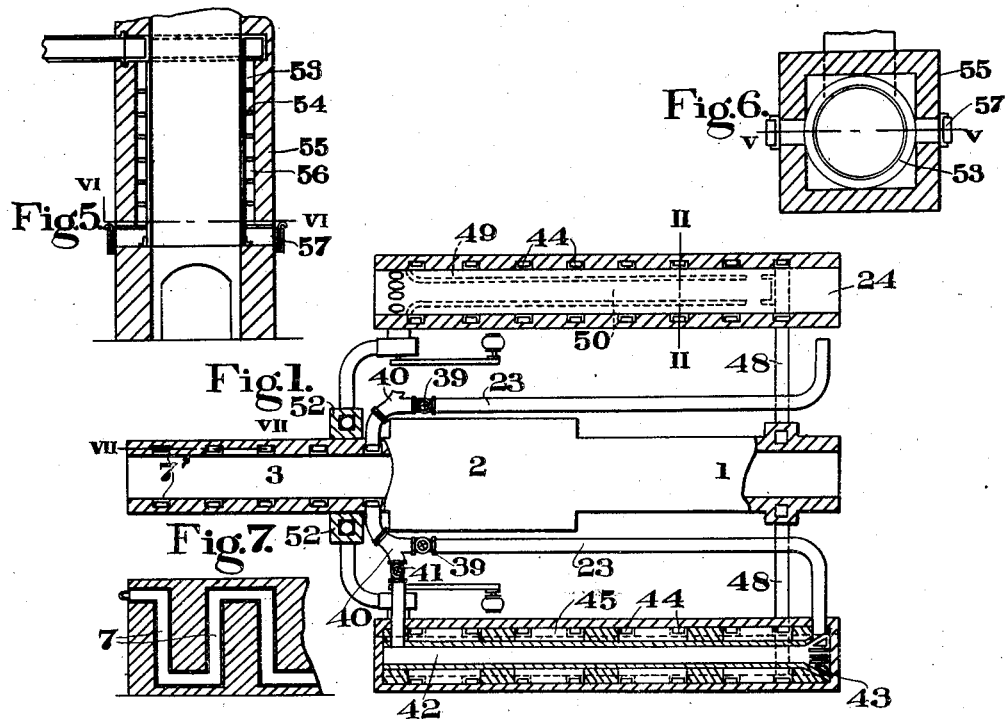
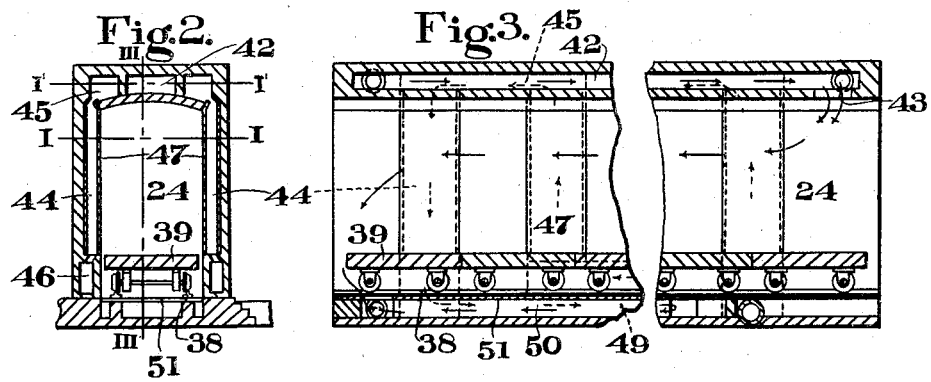
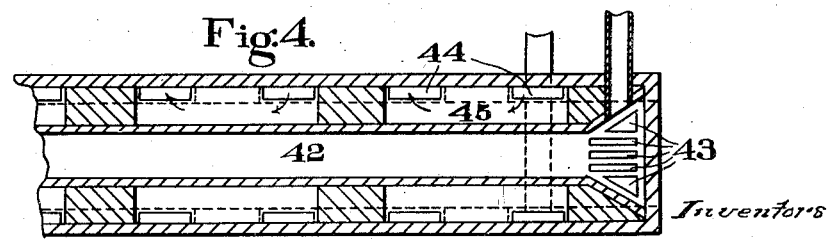
Inventors
F. Fidler
J. G. Maxwell
By _____ their Atty

UNITED STATES PATENT OFFICE.

FRANCIS FIDLER, OF WIGAN, LANCASHIRE, AND JAMES GRAHAM MAXWELL, OF LONDON, ENGLAND.

KILN.

1,364,090. Specification of Letters Patent. Patented Jan. 4, 1921.

Application filed December 27, 1919. Serial No. 347,670.

*To all whom it may concern:*

Be it known that we, FRANCIS FIDLER and JAMES GRAHAM MAXWELL, subjects of the King of Great Britain and Ireland, residing at Wigan, Lancashire, England, and London, England, respectively, have invented certain new and useful Improvements in Kilns, of which the following is a specification.

This invention relates to improvements in kilns of the tunnel and car type.

In the specification of our co-pending application Serial Number 347,699 filed on even date herewith means are described for extracting heat from the cooling zone of a tunnel and car kiln by the aid of air currents which do not make contact with the wares or goods in the cooling tunnel or cooling zone as it is called, so that cracking of the burnt goods is prevented, the heat extracted by the air currents being rendered available for use in any convenient apparatus.

One object of the present invention is to enable this heat to be utilized effectively in drying tunnels or chambers.

Another object of the invention is to enable the waste gases of combustion from the burning zone and preheating zone to be applied to the heating of the drying tunnels or chambers in such a way that they do not make direct contact with the green ware or goods therein, thereby preventing liability to discoloration by reason of the gases containing the products of combustion.

In the accompanying drawings:—

Figure 1 is a plan partly in section, of one form of tunnel and car kiln with drying tunnels, according to the invention, the sections of the drying tunnels, being taken on the lines I—I and I′—I′ Fig. 2.

Fig. 2 is an end sectional elevation of a drying tunnel on a larger scale, the section being taken on II—II Fig. 1.

Fig. 3 is a side sectional elevation on the line III—III Fig. 2.

Fig. 4 is a sectional plan on I′—I′ Fig. 2.

Figs. 5 and 6 are respectively a sectional elevation and sectional plan of part of a vent shaft or chimney, the sections being taken respectively on the lines V—V and VI—VI.

Fig. 7 is a sectional elevation on VII—VII Fig. 1.

In the form illustrated, the tunnel and car kiln comprises a preheating zone 1, a burning zone 2, and a cooling zone 3, the three zones together being in alinement and forming a single tunnel through which the goods or ware travel on cars in the manner well known in the art. The kiln also comprises two drying tunnels 24, 24, fitted with tracks 38 for cars 39 to be run through the tunnels 24 so that the green ware or goods may be dried before being passed into the preheating zone 1. The cooling zone 3 is provided with air ducts in its structure for the purpose of extracting heat from the ware or goods therein by means of air which does not make direct contact with said goods. In order that the air may absorb heat readily the ducts are separated from the interior of the tunnel by good heat conductive material. Particular constructions of these ducts are described in our co-pending application above noted filed on even date herewith. For the sake of simplicity in the present specification they are indicated as zig-zag ducts 7 separated from the interior of the tunnel by panels of cast iron or other heat conductive material. These panels 7′ form heat absorbers and the air passing through the ducts 7 impinge on the absorbers 7′ and extract heat therefrom. Air is passed through the ducts 7 by suitable means such as fans. The air after extracting heat in the ducts without making contact with the ware or goods in the cooling zone 3 is ready in a clean and hot state for use in the drying tunnels 24, and being clean may be led directly into contact with the ware or goods therein. In Fig. 1 pipes 23 are shown for conveying the clean heated air to the drying tunnels 24, the pipes 23 being fitted with stop cocks 39. The air passes from the pipes 23 directly through slots 43 into the tunnels, and after passing through the tunnels in contact with the ware or goods is extracted through openings 44 together with the moisture given off by the green ware or goods, the extraction being effected by suitable means such as fans delivering the extracted air and moisture into vents or chimneys. Branch pipes 40 fitted with stop cocks 41 are also provided so that the clean hot air from the ducts 7 may be led into ducts 42 in the roofs of the drying tunnels 24 and thence through the slots 43 into the interior of the tunnels 24.

The drying tunnels 24 also have gas ducts or flues in their structure for the passage of hot gases of combustion for indirect heating of the green goods or wares for example vertical ducts 44 are connected alternately at the upper and lower ends by horizontal ducts 45, 46. The ducts 44 are separated from the interiors of the tunnels 24 by material of good heat conductive quality such as cast iron panels 47. Hot gases of combustion from the burning zone 2 pass along the preheating zone 1 and thence by pipes 48 into the ducts 44, 45, 46, escaping therefrom into flues or ducts 49, 50 beneath the floor 51 and finally being discharged by the fans through the pipes to the vents or chimneys.

The floors 51 are of heat conductive materials so that not only does heat from the gases pass through the panels 47 but also through the floors 51 the heat being radiated by the panels 47 to the green goods and being conducted to the air in the tunnels by both the panels 47 and floors 51.

The combustion gases are dirty or of a chemical composition likely to be deleterious to the goods but while their heat is utilized in drying the goods they are kept out of contact with them.

The vents or chimneys 52 are preferably fitted with means for preheating air which may be utilized in any way desired for instance in the blast pipe of gas producers supplying gas to the burning zone 2. For example the vents or chimneys 52 are fitted with iron cylinders 53 provided with baffles 54 which together with the brickwork structure 55 form flues 56 for air admitted at 57 to be heated indirectly by the gases passing up the interiors of the cylinders 53.

We claim:

1. A tunnel and car kiln having a cooling zone and a drying tunnel, the walls of the cooling zone having ducts closed against said zone but with portions open to the heat of said zone of relatively high heat conductivity, and a means of communication between said ducts and the interior of the drying tunnel.

2. A tunnel and car kiln having a drying tunnel provided with air ducts in its structure, said ducts being separated from the interior of said drying tunnel by good heat conductive material, and means for delivering waste gases of combustion from the kiln into said ducts, substantially as and for the purpose hereinbefore set forth.

3. A tunnel and car kiln comprising a drying tunnel a preheating zone, a burning zone, a cooling zone, said drying tunnel and cooling zone both having ducts in their structures, means for conducting air heated in the air ducts in the structure of the cooling zone to the interior of the drying tunnel, and means for conducting waste gases of combustion from the burning zone and preheating zone to the ducts in the structure of the drying tunnel, substantially as and for the purpose hereinbefore set forth.

4. A tunnel and car kiln comprising a drying tunnel, a preheating zone, a burning zone and a cooling zone, said drying tunnel and cooling zone both having ducts in their structures, means for connecting the ducts in the structure of the cooling zone to the interior of the drying tunnel, means for connecting the preheating zone and burning zone to the ducts in the structure of the drying tunnel, and means for extracting the gases and moisture from the interior of the drying tunnel, substantially as and for the purpose hereinbefore set forth.

5. A tunnel and car kiln comprising a drying tunnel, a preheating zone, a burning zone and a cooling zone, said drying tunnel and cooling zone both having ducts in the walls of their structures and separated from the interior in each case by heat conductive material, said drying tunnel also having a duct in its crown communicating with the interior of the drying tunnel at one end, means for connecting said ducts in the walls of the cooling zone to the said duct in the crown of the drying tunnel, and means for connecting the interior of the preheating zone, burning zone and cooling zone to the said ducts in the walls of the drying tunnel, substantially as and for the purpose hereinbefore set forth.

6. A tunnel and car kiln comprising a drying tunnel, a preheating zone, a burning zone, and a cooling zone, said cooling zone and drying tunnel both having ducts in their structures, means for passing air through the ducts in the structure of the cooling zone and thence through the interior of the drying tunnel, means for extracting gases of combustion from the burning and preheating zones and for passing said gases through the ducts in the structure of the drying tunnel, and means for extracting the said air and gases from the said ducts and interior of the drying tunnel, a vent shaft for receiving said gases and air, air ducts surrounding said vent shaft for the passage of fresh air to be heated by the waste heat of the gases and air passing through said vent shaft, substantially as and for the purpose hereinbefore set forth.

7. A drying tunnel for kilns having zigzag ducts in the walls thereof, heat conductive material separating said ducts from the interior of the tunnel, means for forcing air through said ducts to absorb heat from the articles being dried, and means for utilizing such heated air beyond the tunnel.

8. A drying tunnel having ducts in the walls thereof, cast iron panels separating said flues from the interior of said tunnel, and means for passing hot gas through said flues to make contact with said panels, substantially as and for the purpose hereinbefore set forth.

In testimony whereof we have signed our names to this specification in the presence of two subscribing witnesses.

FRANCIS FIDLER.
J. GRAHAM MAXWELL.

Witnesses:
  FREDK. E. SQUIRE,
  J. CLARK.